US011035701B2

(12) United States Patent
Ollila et al.

(10) Patent No.: US 11,035,701 B2
(45) Date of Patent: Jun. 15, 2021

(54) FRONT PICK-UP ILLUMINATED POINTER

(71) Applicant: Continental Automotive Systems, Inc., Auburn Hills, MI (US)

(72) Inventors: Curt Ollila, Fenton, MI (US); Vyacheslav Birman, Auburn Hills, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 258 days.

(21) Appl. No.: 16/112,875

(22) Filed: Aug. 27, 2018

(65) Prior Publication Data

US 2018/0364078 A1    Dec. 20, 2018

Related U.S. Application Data

(63) Continuation of application No. PCT/US2017/019494, filed on Feb. 24, 2017.

(60) Provisional application No. 62/300,365, filed on Feb. 26, 2016.

(51) Int. Cl.
| | | |
|---|---|---|
| *G01D 13/22* | (2006.01) | |
| *F21V 5/02* | (2006.01) | |
| *F21V 7/00* | (2006.01) | |
| *G01D 13/26* | (2006.01) | |
| *B60K 35/00* | (2006.01) | |

(52) U.S. Cl.
CPC ............... *G01D 13/22* (2013.01); *F21V 5/02* (2013.01); *F21V 7/0091* (2013.01); *G01D 13/265* (2013.01); *B60K 35/00* (2013.01); *B60K 2370/33* (2019.05)

(58) Field of Classification Search
CPC ...... G01D 13/22; G01D 13/26; G01D 13/265; G01D 13/28; F21V 5/02; F21V 7/0091; B60K 2370/33; B60K 35/00
See application file for complete search history.

(56) References Cited

U.S. PATENT DOCUMENTS

| | | | | |
|---|---|---|---|---|
| 3,491,245 A | * | 1/1970 | Hardesty | 250/227.11 |
| 4,218,726 A | * | 8/1980 | Fukasawa et al. | 362/23.19 |
| 4,300,470 A | * | 11/1981 | Furukawa | 116/332 |
| 4,848,264 A | * | 7/1989 | Knietzsch et al. | 116/332 |
| 4,959,759 A | * | 9/1990 | Kohler | 362/489 |
| 5,590,945 A | * | 1/1997 | Simms | 362/623 |
| 6,032,608 A | * | 3/2000 | Oreans et al. | 116/288 |
| 6,647,199 B1 | * | 11/2003 | Pelka et al. | 385/146 |
| 7,163,303 B1 | * | 1/2007 | Venkatram | 362/23.2 |

(Continued)

FOREIGN PATENT DOCUMENTS

EP    1610098 A1    12/2005

OTHER PUBLICATIONS

International Search Report and Written Opinion dated May 10, 2017 from corresponding International Patent Application No. PCT/US2017/019494.

*Primary Examiner* — Alan B Cariaso (57) ABSTRACT

An illuminated pointer for a vehicle instrument cluster provides a more uniform light by propagating light from a source, through an elongate, light-transmitting prism formed to have multiple, inclined light-reflecting surfaces. Each surface being at a different angle, reflects light at a slightly different angle producing a corresponding number of refracted light maxima along the length of the prism. A more uniform refracted light is produced.

7 Claims, 6 Drawing Sheets

(56) References Cited

U.S. PATENT DOCUMENTS

| | | | |
|---|---|---|---|
| 2008/0100841 A1* | 5/2008 | Han | G01P 1/07 356/364 |
| 2014/0078713 A1 | 3/2014 | Maebashi et al. | |
| 2015/0151677 A1 | 6/2015 | Birman et al. | |
| 2016/0109098 A1* | 4/2016 | Martoch | 362/517 |

* cited by examiner

FRONT PICK-UP ILLUMINATED POINTER

BACKGROUND

Cars and trucks have instrument panels, also known as instrument clusters that include gauges and dials, which provide vehicle operation information to a driver. Such gauges and dials can be digital, most drivers prefer "analog" gauges and dials having pointers or indicators that rotate about an axis and "point to" a number, symbol, icon or an area on a dial.

Prior art pointers are preferably provided with some type of illumination in order to make them visible in darkness, i.e., at at night. Some such pointers are made from a light-transmissive plastic such as a polycarbonate or acrylic and have a light introduced at one end of the pointer, which is carried throughout the length of it emitted somewhere along the pointer's length whereat the light is emitted and illumination provided to a localized area of the gauge or dial. Stated another way, prior art light-transmissive pointers provide an illumination that is unevenly distributed and which can adversely affect the ability to see a number, symbol, icon or other indication on a gauge or dial. A pointer that provides a more uniform illumination along its length would be an improvement over the prior art.

DETAILED DESCRIPTION

The reflection and refraction of light by a surface that separates two different light-transmissive media, such as air and a light-transmissive transparent plastic, is well known. If two light-transmissive media have different indexes of refraction, light that travels through their interface is bent or refracted. Light which strikes an interface between two different media, and which is redirected away from it at the same angle at which it struck the interface, is reflected.

As is well known, a reflected ray lies in the plane of its incidence and has an angle of reflection equal to the angle of incidence. A refracted ray of light also lies in the plane of incidence and has an angle of refraction, $\Theta$, (theta) which is related to the angle of incidence theta $\Theta 1$ by the well-known equation $n1 \sin \Theta = n2 \sin \Theta$, where $n1$ and $n2$ are dimensionless constants referred to as the indices of refraction of each medium through which the light travels.

It is well known that light striking an interface between two different light-transmissive media will be totally or completely reflected if the light's angle of incidence is greater than or equal to a "critical angle" $\Theta_c$. The critical angle is defined as the arcsine of the quotient of the index of refraction of the first media, $n_1$ and the index of refraction of the second media, $n_2$. Stated another way, the critical angle for a total internal reflection to occur is:

$$\theta_c = \sin^{-1}\frac{n1}{n2}$$

and is thus dependent on the light transmission of the two different media.

Because the sine of any angle cannot be greater than one, the index of refraction of the first media cannot be greater than the index of refraction of the second media. Stated another way, total internal reflection cannot occur when the incident light is in a medium having a lower index of refraction than a medium that it strikes.

As used herein, the word "prism" refers to solid bodies bounded by two identical or nearly-identical, parallel or substantially parallel, similarly-oriented polygonal bases and at least three lateral faces that are parallelograms. It also includes polyhedrons with two polygonal faces lying in parallel or substantially planes and with the other faces parallelograms.

A right prism is a prism, of which the lateral edges are perpendicular or substantially parallel to the bases.

A pyramid is a body bounded by a polygonal base and at least three triangular faces converging to a point called the apex or vertex.

The adjective form of "elongate" means stretched out or, long and slender.

The term "normal" refers to a geometric line, perpendicular to a surface at either a point of reflection or refraction.

The term "angle of incidence" refers to a geometric angle measured relative to the normal of a surface on which a light ray is incident.

The term "angle of reflection" is also measured relative to the normal of a surface through which a light ray passes. An "angle of refraction" is also measured relative to the normal.

The term "trapezoid" refers to a quadrilateral having four sides, only two of which are parallel.

It is well known that light waves spread out as they move away from their source. The path of a light wave can nevertheless be approximated as being in a straight line and is thus represented herein by lines or rays in order to depict light transmission, its reflection, refraction and subsequent re-radiation.

Figure 1:
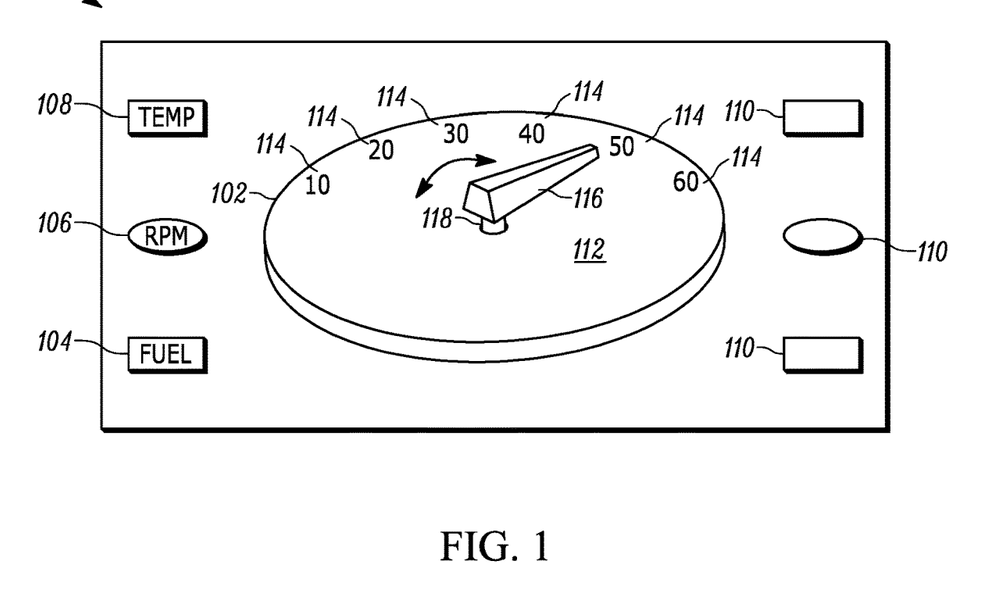
FIG. 1 is a perspective view of an instrument panel or instrument cluster for a motor vehicle.

Referring now to the figures, FIG. 1 depicts a vehicle instrument panel or cluster 100 having various types of gauges 102, 104, 106, 108 and 110. A centrally-located gauge 102, which is a speedometer, comprises a dial 112 on which numbers 113 corresponding to the vehicle's speed are applied. An "illuminated" pointer 116, which is connected to a spindle 118, rotates clockwise and counter-clockwise with the spindle in order to "point to" or indicate the speed at which the vehicle is traveling. The spindle 118 extends upwardly through the dial 112.

Figure 2:
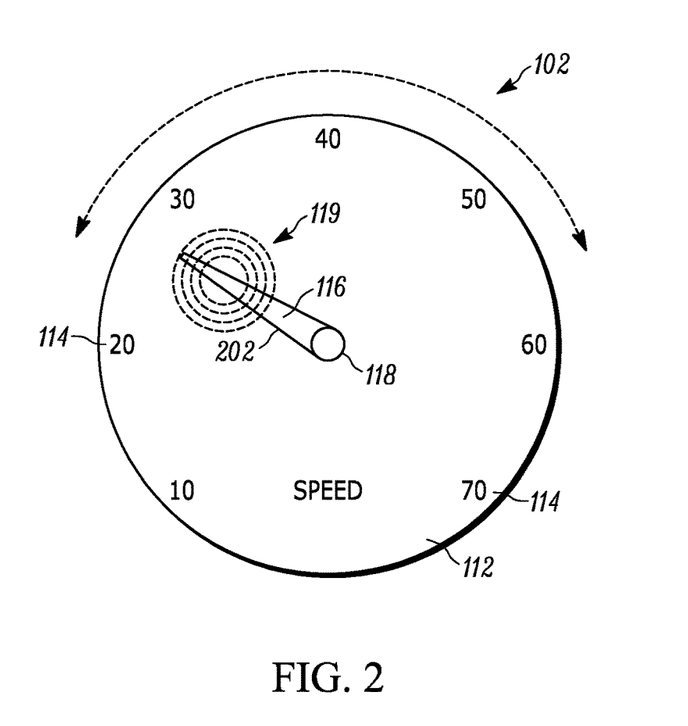
FIG. 2 is a front view of one gauge or dial of the instrument cluster shown in FIG. 1.

FIG. 2 is a front or plan view of the speedometer gauge 102 depicted in FIG. 1. The dial 112 and the speed-indicating characters 114 are identified or "pointed to" by the pointer 116 as it rotates on the axis of the spindle 118.

Several broken-line concentric circles identified by reference numeral 119, and which are centered about a region on the pointer 116, which is identified by reference numeral 202, represent a relatively localized maxima of light emitted from the pointer 116. The light-maxima region 202, i.e., a region or an area of a relatively brighter light, is formed from light emitted from the bottom of the pointer, which is made from light-transmitting material such as polycarbonate, glass, crystal or the like.

Figure 3:
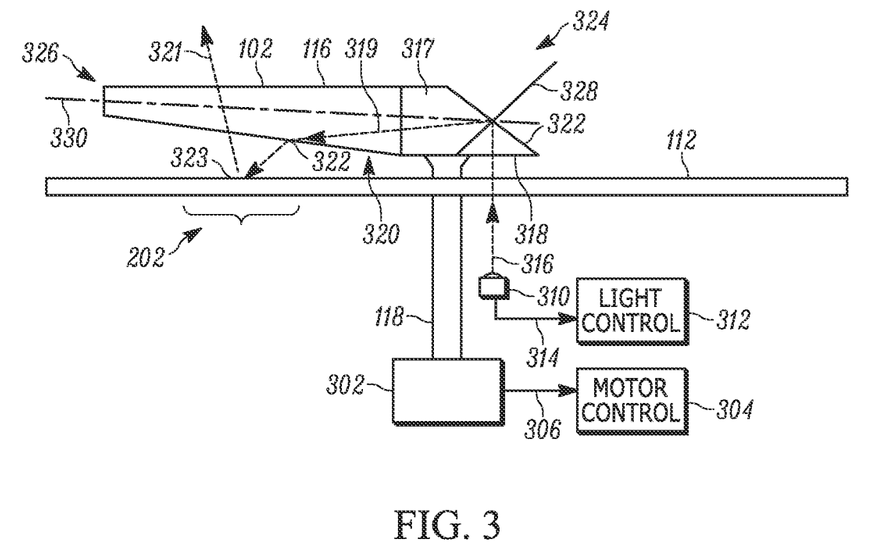
FIG. 3 is a side view of the gauge or dial depicted in FIG. 2, showing a stepper motor that rotates the pointer on a shaft extending through the instrument cluster circuit board and a light source which provides light into the interior of the pointer.

FIG. 3 is a side view of the gauge or dial shown in FIG. 2. A stepper motor 302 is connected to a motor controller 304 via a conventional cable or bus 306. Signals from the motor controller 304 to the stepper motor 302 cause the spindle 118 to which the pointer 116 is attached, to rotate either clockwise or counter clockwise as indicated by the arrow 206 in FIG. 2. One or more light-emitting diodes (LEDs) or incandescent bulbs, referred to interchangeably as a light source 310, are connected to a light controller 312 via one or more wires 314, in order to provide a controlled source of light to the pointer.

As mentioned above, light waves from a light source can be approximated by a line or ray and light waves are thus represented in the figures of this disclosure by rays and lines. In FIG. 2, light emitted from the LEDs is identified by a line identified by reference numeral 316. That light 316 enters the light-transmitting pointer 116 at a region 318 on the bottom surface 320 of the pointer 116. Since the light entry region 318 is substantially flat and substantially orthogonal to the incident light 316, all of the light 316, or at least substantially all of it enters a prism 317 formed at the end of the pointer 116 proximate to the spindle 118.

As FIG. 3, shows, the light 316 strikes an inclined surface 322 at the rear or second end 324 of the pointer/prism 116 and totally, or near-totally reflected toward the opposite end 326 of the pointer or prism 116. The material from which the pointer 116 made and the light's 316 of incidence on the inclined surface 322 are thus chosen or selected in advance, i.e., predetermined, in order to totally reflect the light 316 off the inclined surface 322.

The inclined surface 322 has a normal 328, which as noted above is a geometric line, perpendicular to the inclined surface 322. The light 316 from the light source 310 that enters the prism strikes the inclined surface 322 at an angle, a (alpha) relative to the normal 328. The angle of incidence, a and the index of refraction, n, of the material from which the pointer 116 is made, are selected in order to obtain a total internal reflection or near-total internal reflection of the light 316 and a redirection of the reflected light 319 down or along an axis 330 that extends from or between the two opposing ends of the pointer/prism 116. The reflected light, 319 travels partway down the length of the pointer/prism 116 and exits the pointer/prism at a location identified by reference numeral 322, which as shown, is approximately half-way between the two opposing ends of the pointer/prism 116. Light that exits the pointer/prism 116 at that location 322 strikes an area 323 of the surface of the dial 112 and illuminates the area and re-reflected upwardly as another light ray 321. The inclined surface 322 at the rear end 324 of the pointer/prism 116 thus reflects light toward a relatively localized area or region of the bottom surface 320 of the pointer 116 from which the light from the light source 310 is transmitted or "piped" and provides a relatively localized illumination of the dial.

Figure 4:
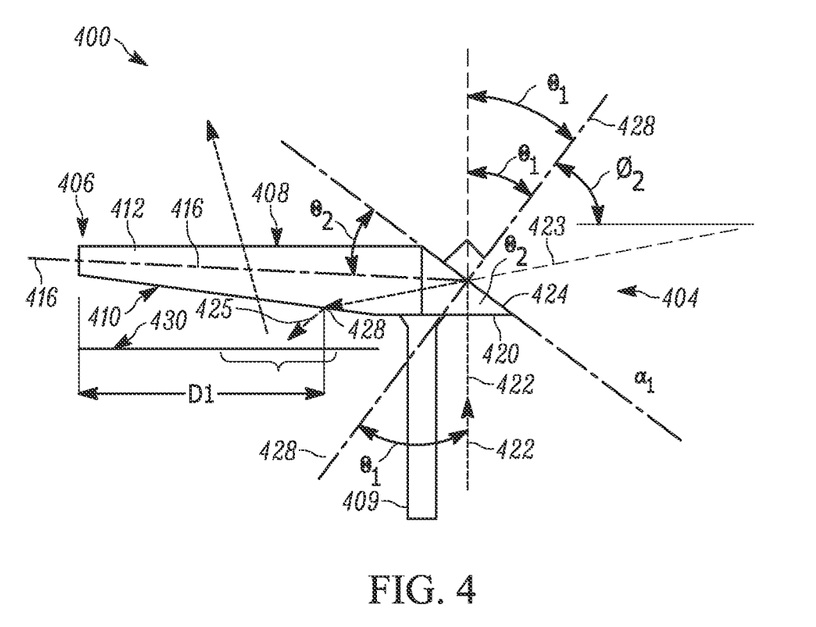
FIG. 4 is an isolated side view of a pointer showing light from a source incident on an inclined surface at one end of a first embodiment of a light transmitting pointer body.

FIG. 4 is an isolated, cross-sectional view of another embodiment of an illuminated pointer 400 for a vehicle instrument cluster, such as the instrument cluster 100 shown in FIG. 1. The pointer 400 in FIG. 4 is also made from a transparent material such as glass, crystal or polycarbonate.

The pointer 400 is considered to be an elongate, light-transmitting prism 400, having a first end 404 and an opposing second end 406. Between the first and second ends 404, 406 respectively are a top face or surface 408 an opposing bottom surface or face 410 and first and second opposing sides 412, only one side being shown in FIG. 4 because the other side is substantially coincident to the side depicted in FIG. 4.

The pointer, which is also a prism 400, has a geometric axis 416 that extends through the pointer 400, only a portion of which is shown in FIG. 4, however, in the interest of drawing legibility. The axis 416 extends completely through the pointer 400, including through the first and second ends, 404, 406. The axis 416 thus has no real dimension or size.

At the second end 406 of the pointer/prism and near a pointer-rotating spindle 409, a light wave 422 enters a substantially flat, substantially horizontal portion or area 420 of the bottom surface 410 and travels upwardly through the material from which the pointer 400 is made. The area 420 where the light enters the pointer/prism 400 is considered herein to be a surface through which the pointer illumination light enters the pointer. The area is thus referred to as an "illumination light entry surface." The light wave entering the illumination light entry surface is represented by a ray or line identified by reference numerals 422.

The light wave 422 is incident on a first inclined surface 424 at an angle of incidence, $\Theta_1$, measured relative to the normal 428 of the first inclined surface 424. The inclined surface 424 is itself of course inclined relative to horizontal and which is a different angle, $\Theta_2$ Horizontal is considered to be a geometric plane that is parallel to or coincident with a plane in which the axis 416 of the prism 402 lies.

As noted above, total internal reflection of the first light wave 422 will result when the angle of incidence Θ1 is substantially equal to the arcsine of the quotient of the index of refraction of the material from which the prism 400 is made and air through which the light wave 422 passes when it leaves a light source. Such a reflection, represented by the ray identified by reference numeral 423 can be seen extending from the first inclined surface 424 to a distant location or point identified in the figure by reference numeral 428. The reflected wave 423 strikes the bottom surface 410 and is refracted (bent) out of the pointer/prism 400. A localized light "maxima" is thus produced at and around the location where the refracted light wave 423 leaves the bottom surface of the pointer/prism.

Refracted light 425 strikes the top surface 430 of a dial and is re-reflected as a separate light wave. A light wave 422 from a light source under the pointer 400 near the spindle can thus be propagated through the light transmitting prism material to strike an inclined face 424, reflected by the inclined face at an angle, which determines a location to which the reflected light 423A is transmitted down the length of the pointer/prism and thus provides a relatively localized illumination.

Figure 5:
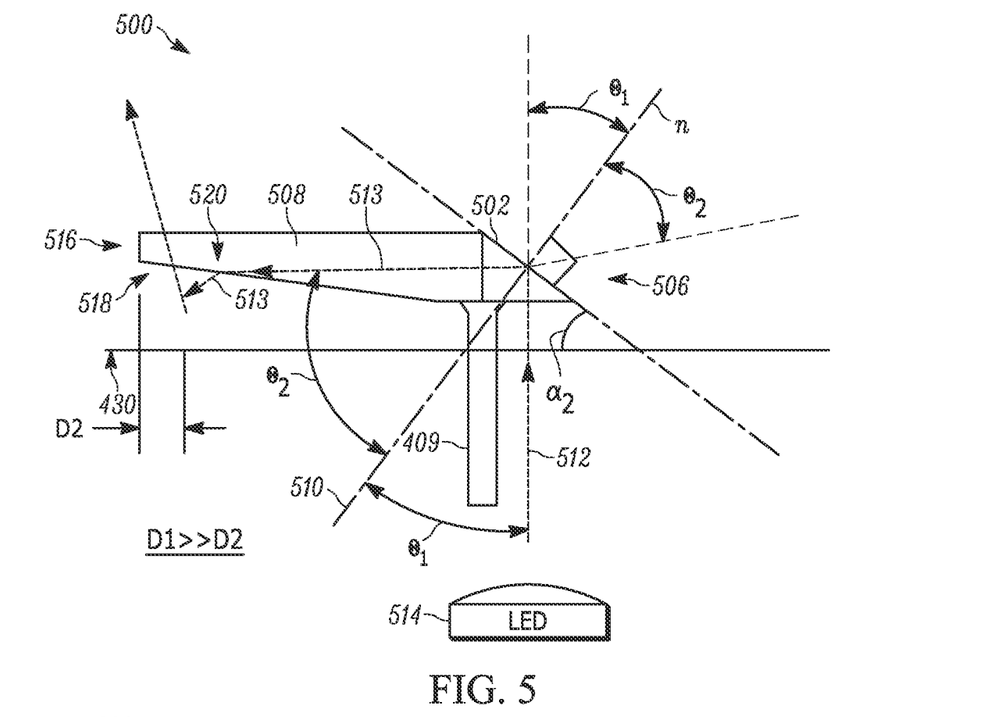
FIG. 5 is a side view of a second embodiment of a light-transmitting pointer showing an inclined surface at a different angle of inclination as compared to what is shown in FIG. 4.

FIG. 5 shows an alternate embodiment of an illuminated pointer 500. The pointer 500 depicted in FIG. 5 differs from the pointer 400 depicted in FIG. 4 by the inclination angle of the inclined surface 502 at the second end 506 of the elongate, light-transmitting prism 508. The normal 510 of the inclined surface 502 is at a much steeper angle relative to horizontal, the inclination angle $\Theta 2$, being the angle of incidence of a light wave 512 incident on the inclined surface 502.

As with the pointer 400 depicted in FIG. 4, the index of refraction of the material from which the prism 508 is made, and the angle of incidence $\Theta 2$, are selected, i.e., predetermined, in order to achieve a total or at least near-total reflection of the light 512 from a light source 514.

As can be seen in FIG. 5, the relative steep angle of inclination of the inclined surface 502 causes a reflected wave 513 to travel farther down the length L of the prism toward the second end 516. The reflected wave 513 is shown as intersecting the bottom surface 518 at a point 520 that is separated or distant from the second end by a shorter distance D2. The distance that the light travels through the prism 508 is thus determined by the inclination angle of the inclined surface 502 at the second end 506 of the prism 508.

Figure 6:
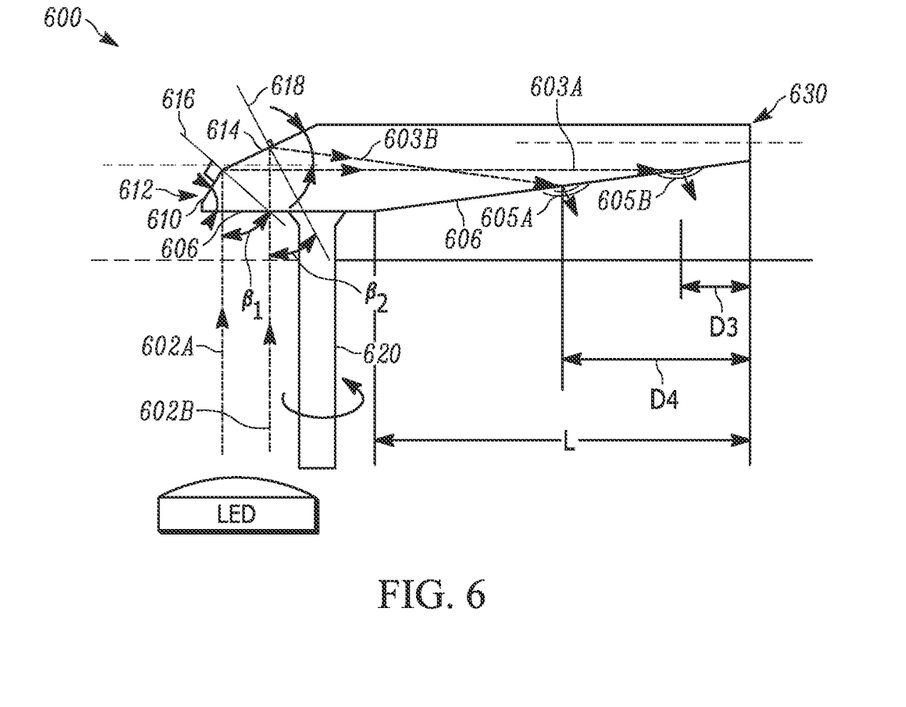
FIG. 6 is a side view of another embodiment of a pointer for an instrument cluster, the pointer shown in FIG. 6 having two differently-inclined surfaces at one end of the pointer.

FIG. 6 shows a third embodiment of an illuminated pointer 600 for a vehicle instrument cluster. In this figure, light waves 602, (represented by rays or lines) pass through an illumination light-entry surface 604, which is on the bottom surface 606 of the light-transmitting prism 600.

The light wave 602A strikes a "first" inclined surface 610 at the rear or second end 612. A second light wave 602B strikes a "second" inclined surface 614. Both inclined surfaces 610 and 614 have corresponding normal, identified by reference numerals 616 and 618 respectively.

The first light wave 602A strikes the first inclined surface 610 at a first angle of incidence denominated as $\beta_1$. The second light wave 602B strikes the second inclined surface 614 at a second angle of incidence denominated as $\beta_2$. The first light wave 602A is reflected. The reflected version of the first light wave is identified by reference numeral 603A. The reflected version of the second light wave 602B is also reflected and identified as 603B. Both reflected light waves 603A and 603B enter the elongated portion of the prism, past the axle 620 on which the prism rotates.

As can be seen in FIG. 6, the first reflected wave 603A travels farther down the length, L, of the prism toward the second end 630, than does the second reflected light wave 603B due to the fact that the inclined surfaces are at different inclination angles. The first reflected light wave 603A strikes or impinges upon the bottom surface 606 at a "first" distance, D3, away from the second end 630. The second reflected wave 603B strikes the bottom surface closer to the axle 620 and farther from the second end 630 at a distance D4.

Waves 603A, 603B that are incident on the bottom surface 606, are refracted out of the material from which the pointer is made. Stated another way, the two inclined surfaces 610 and 614 reflect light incident upon them at different angles and thus produce light maxima 605A and 605B at two different locations along the length L of the pointer 600.

Figure 7:
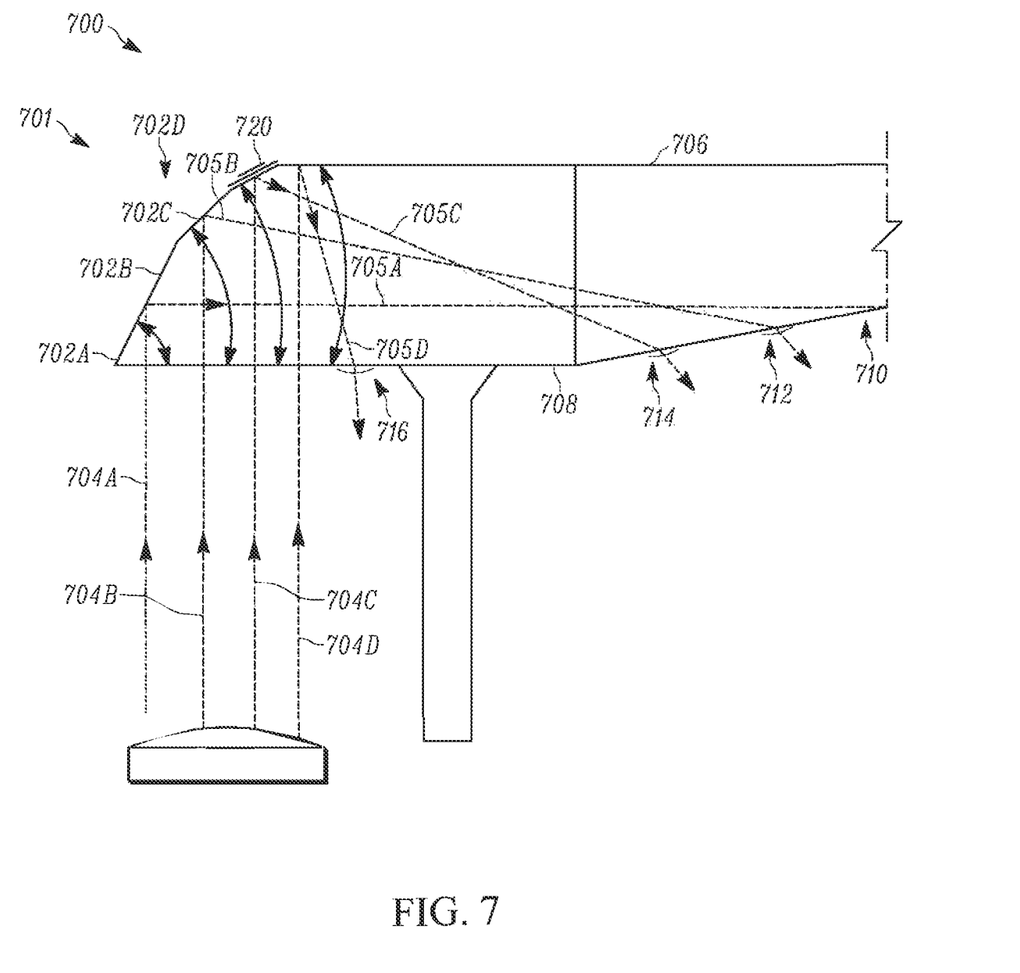
FIG. 7 depicts a preferred embodiment of a pointer for an instrument cluster having several inclined surfaces, each of them inclined at a different angle.

FIG. 7 shows yet another embodiment of an illuminated pointer for a vehicle instrument cluster. In FIG. 7, only the second end 701 of the pointer is depicted in order to better illustrate multiple planar inclined surfaces 702A-702D, each of which reflects or at least partially reflects light waves 704A-704D incident on them after entering a illumination light entry surface 718 on the bottom surface 708 of the light-transmitting prism 700.

Each of the incident light waves 704A-704D is reflected and propagates down the length of the pointer as reflected waves 705A-705D. Each reflected wave, 705A-705D travels along a different inclined path through the prism and impinges on the bottom surface 708 of the pointer at different locations 710, 712, 714 and 716. The differently-inclined surfaces 704A-704D thus produce light maxima at differently locations where each reflected wave 705A-705D strikes or impinges upon the bottom surface 708.

Those of ordinary skill in the art should recognize that providing multiple planar inclined surfaces at one end of a light-transmissive prism and to which light is provided from a light source, will produce a corresponding number of refracted light maxima along the bottom surface of the prism and thus better-distribute light from the light source along the entire length of a pointer fabricated from a light-transmissive material. Those of ordinary skill in the art might also recognize that obtaining a total internal reflection from each of the inclined surfaces might not be possible without providing a reflective surface. Accordingly, alternate embodiments include a thin, light-reflective material layer 720 applied to the backside or outside surfaces of the inclined surfaces 704A-704D in order to insure that each of them can provide a total or near-total internal reflection of incident light.

Figure 8:
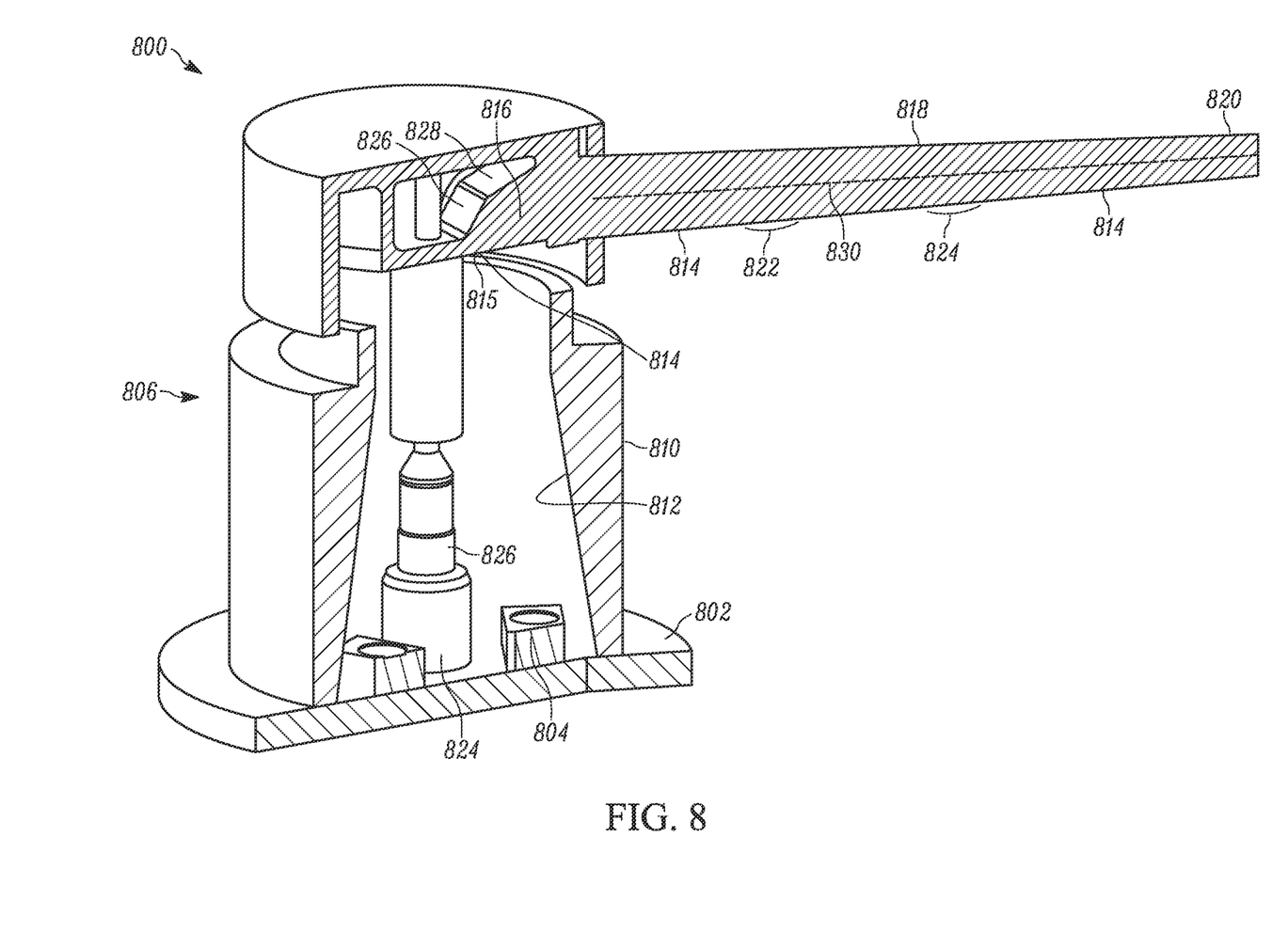
FIG. 8 is a perspective view of an embodiment of a illuminated pointer system for a vehicle instrument cluster showing an arrangement of a light-transmitting prism.

FIG. 8 is a cut-away perspective view of an illuminated pointer, light source and drive mechanism for use with a vehicle instrument cluster, such as the one depicted in FIG. 1. The assembly 800 is mounted to a conventional circuit board 802 attached to which are light-emitting diodes 804.

A housing 806 has a relatively cylindrical-shaped exterior surface 810 and a substantially conical-shaped interior surface 812. The interior of the housing 806 is hollow and preferably coated with a white or nearly-white color reflective paint or coating to enhance transmission of light from the LEDs 804 into the bottom 814 of the second end 816 of a light-transmitting prism 818 having a first end 820 that is proximate to or "points" to legends or demarcations on a dial of a gauge forming part of an instrument cluster.

A stepper motor 824, also attached to the circuit board 802 has an output shaft 826 that extends upwardly through the conical-shaped interior of the housing 806 and is attached to the second end of the light-transmitting prism 818. Electrical signals provided to the stepper motor 824 cause the prism 818 to rotate clockwise or counter clockwise thereby indicating different quantities or providing other information by virtue of the angular displacement of the stepper motor 824 around its vertically-oriented axis, not shown.

As described above, light from the LEDs 804 enters an illumination light surface area 815 on the bottom of the pointer and above the LEDs 804. The light from the LEDs strikes multiple inclined surfaces 826 and 828 at the second end of the light-transmitting prism 818. Light incident on those inclined surfaces 826 and 828 propagates downwardly along the axis 830 of the prism 818 and impinges upon the bottom surface 814 at different locations 832 and 834 producing at least two different-location light maxima 822, 824 on the bottom surface 814.

Figure 9:
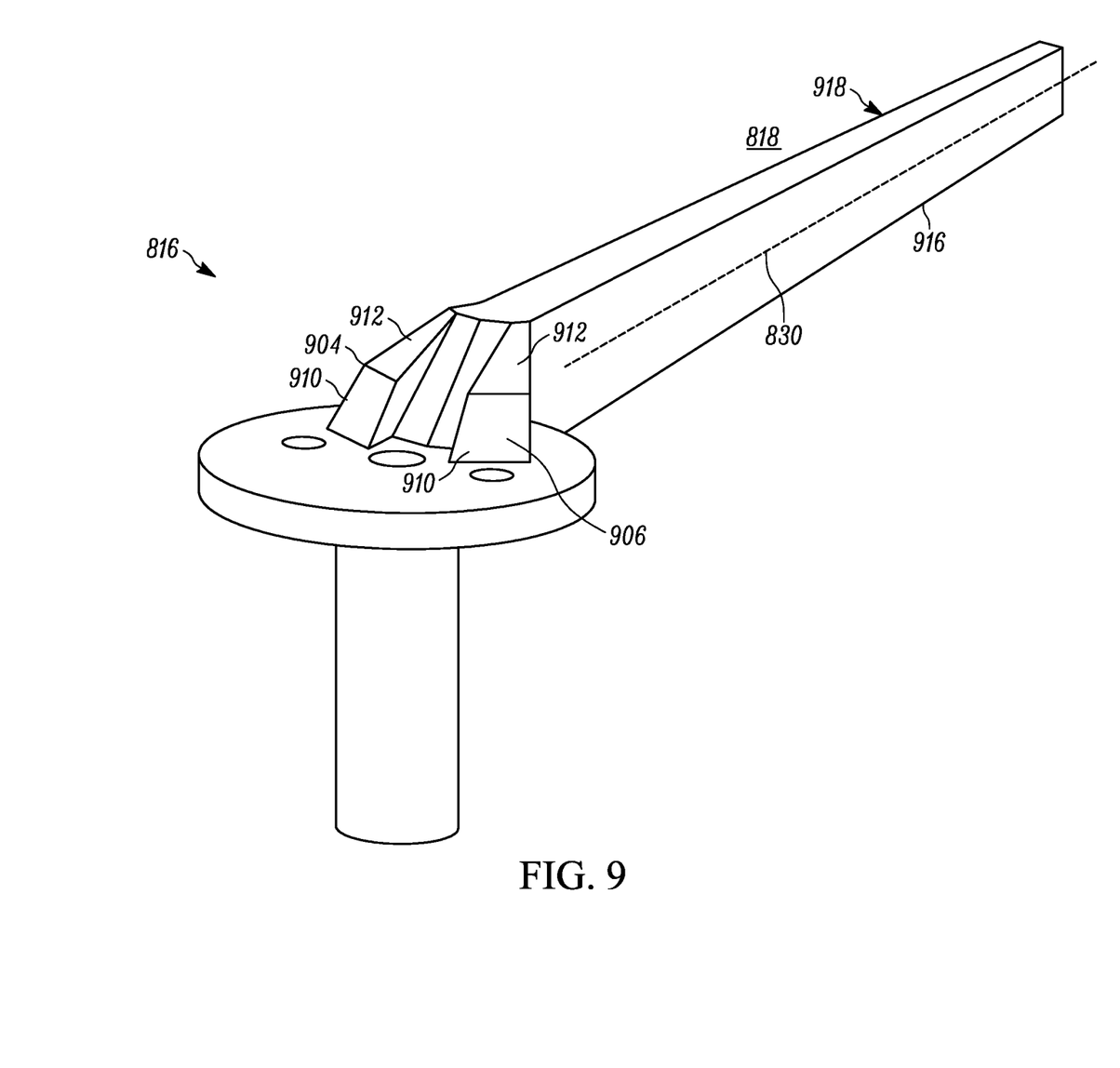
FIG. 9 is an isometric view of an elongated, light-transmitting prism of FIG. 8 and which is a configured to transmit light provided at a bottom surface and transmitted along the length of the prism body.

FIG. 9 is a perspective view of the light-transmitting prism 818 shown in FIG. 8, arranged to better illustrate the second end 816 of the light-transmitting pointer/prism 818. The second end 816, is "sized, shaped and arranged" to provide multiple inclined surfaces, the normals of which are inclined at different angles but nevertheless directed downwardly or along the axis 830 of the prism. Two "separate prisms 904 and 906 formed at the second end 816 of the prism 818 each have light-reflecting panels or surfaces 910 and 912, which are inclined at different angles. The reflecting panels 910 and 912 can also have a pitch or rotation by which light reflected off of them will impinge on the sides 916 and 918 of the prism 818 as the reflected light travels down and along the axis 830.

The angles of incidence of the reflected light waves traveling down the length of the light-transmitting prism body 818 and the indices of refraction are selected such that there is a total reflection along the length of the body as the body tapers or narrows from its second end 816 to its first end 820.

Referring again to FIG. 7, those of ordinary skill in the art should recognize that as the number of inclined planar surfaces increases toward infinity, the shape of the second surface eventually becomes elliptical or semi-circular. In such an embodiment, i.e. having an elliptical surface joined seamlessly to the bottom, top and side surfaces of the light-transmitting prism, an even more-uniformly distributed light can be generated from the bottom surface of the portion of the prism that extends beyond the axle on which the light-transmitting prism is mounted.

Those of ordinary skill in the art should recognize that the elongate, light-transmitting prisms may be formed from a transparent solid material(s) having an index of refraction less than air when combined to form the prism. Those of ordinary skill in the art should recognize that the elongate, light-transmitting prisms having such shape as described and shown herein will result in a cross-sectional shape, which is substantially trapezoidal-shaped.

Those of ordinary skill in the art should recognize that the elongate, light-transmitting prisms used to provide an illuminated pointer are solid, i.e., not hollow, bodies of materials that will transmit light. In order to insure total internal reflection of incident waves on an inclined surface at shallow angles, alternate embodiments employ a thin reflective film that is deposited onto the outside surfaces of the solid, light-transmitting prism. In FIG. 7, such a surface, which can be made of silver or other similar metal, is depicted as being applied to one of the outside surface of one of the inclined panels 702D and identified by reference numeral 720.

The foregoing description is for purposes of illustration only. The true scope of the invention is set forth in the following claims.

What is claimed is:

1. An illuminated pointer for a vehicle instrument cluster, the pointer comprising:
    an elongate, light-transmitting prism having a bottom surface, first and second side surfaces, a top face, first and second opposing ends, a geometric axis extending between said first and second ends, and a length, the second end comprising a prism-termination surface through which the axis extends, the first end comprising a plurality of substantially planar inclined surfaces, which are joined at corresponding edges, each inclined surface at the first end having a geometric normal, a plurality of the normals of the inclined surfaces being inclined at predetermined angles relative to the axis such that at least some of the normals extend into and at least partway through the elongate prism toward the second end and extend outwardly from the elongate prism through the bottom face, the first end also having an illumination light entry surface, through which light from a source enters into the elongate prism and is thereafter reflected by said inclined surfaces at the first end, wherein the elongate prism is a transparent solid, formed from materials having an index of refraction less than air when combined to form the prism.

2. The illuminated pointer of claim 1, wherein the elongate prism has a cross-sectional shape, which is substantially trapezoidal-shaped.

3. The illuminated pointer of claim 1, wherein a plurality of the inclined surfaces are inclined at angles, selected to provide a total internal reflection of light that is incident on said plurality of inclined surfaces.

4. The illuminated pointer of claim 1, further comprising a reflective surface applied to at least one of the inclined surfaces.

5. The illuminated pointer of claim 1, wherein:
    a first inclined surface is inclined at a first angle such that the normal of said first inclined surface extends partway through the elongate prism and extends through the bottom surface at a first distance away from the second end;
    a second inclined surface is inclined at a second angle, different from the first angle, such that the normal of said second inclined surface extends partway through the elongate prism and extends through the bottom surface at a second distance away from the second end.

6. The illuminated pointer of claim 5, further comprising a third inclined surface, which is inclined at a third angle, which is different from the first and second angles, the normal of said third inclined surface extending partway through the elongate prism and extending through the bottom surface at a third distance away from the second end, the third distance being different from the first and second distances.

7. The illuminated pointer of claim 1, wherein the materials having the index of refraction less than air when combined to form the prism are at least two pieces formed from the same type of material and combined to form the prism.

* * * * *